United States Patent
Okada et al.

(10) Patent No.: US 6,530,034 B1
(45) Date of Patent: Mar. 4, 2003

(54) METHOD AND APPARATUS FOR ERROR RECOVERY IN A STORAGE DEVICE

(75) Inventors: Kenji Okada, Yokohama (JP); Hideo Asano, Mahida (JP); Kazushige Okutsu, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,085

(22) Filed: Nov. 5, 1999

(30) Foreign Application Priority Data

Nov. 9, 1998 (JP) ............................................. 10-317859

(51) Int. Cl.7 ................................................ H02H 3/05
(52) U.S. Cl. ............................... 714/5; 714/44; 360/31; 360/53
(58) Field of Search ..................... 714/5, 44; 369/47.14, 369/53.15, 53.16, 53.17; 360/53, 25, 31, 69

(56) References Cited

U.S. PATENT DOCUMENTS

| | | | | |
|---|---|---|---|---|
| 5,195,076 A | * | 3/1993 | Aoki ........................... | 360/53 |
| 5,418,767 A | | 5/1995 | Gaudet et al. | |
| 5,479,651 A | * | 12/1995 | Nakaguchi ................... | 360/31 |
| 5,768,502 A | * | 6/1998 | Ikushima et al. ............... | 714/5 |
| 6,034,831 A | * | 3/2000 | Dobbek et al. .......... | 369/44.25 |
| 6,043,945 A | | 3/2000 | Tsuboi et al. | |
| 6,043,946 A | * | 3/2000 | Genheimer et al. ........... | 360/53 |
| 6,118,608 A | | 9/2000 | Kakihara et al. | |
| 6,124,998 A | * | 9/2000 | Kanegae ....................... | 360/53 |
| 6,181,500 B1 | * | 1/2001 | Serrano et al. ................ | 360/25 |

FOREIGN PATENT DOCUMENTS

| | | | |
|---|---|---|---|
| EP | 0 651 389 A1 | 10/1994 | ............ G11B/20/18 |
| JP | 3-135459 | 6/1991 | ............. B04B/7/16 |
| JP | 7-182793 | 7/1995 | ............ G11B/20/12 |
| JP | 9251727 A2 | 3/1996 | ............ G11B/20/18 |
| JP | 8-180612 | 7/1996 | ............ G11B/20/18 |
| JP | 10-255403 | 9/1998 | ............ G11B/20/12 |
| JP | 3050375 | 3/2000 | ............ G11B/20/12 |

* cited by examiner

*Primary Examiner*—Robert Beausoliel
*Assistant Examiner*—Yolanda L. Wilson
(74) *Attorney, Agent, or Firm*—G. Marlin Knight; Ron Feece

(57) ABSTRACT

Method and apparatus are described for recovery from temporary errors in a disk drive resulting from excessive temperature or the like. After a first error recovery procedure has been executed and failed, a waiting time is selected after which a second error recovery procedure will be performed. The length of the waiting time can be determined by the measured temperature if a sensor is included in the drive. If the error still cannot be recovered after the waiting period, the location where the error had occurred is temporarily registered as defective. Subsequently the drive will retest the failing location and remove the temporary defect registration if the error has been removed by, for example, the temperature having gone down.

9 Claims, 5 Drawing Sheets

| LBA | 000000 | 000001 | 000002 | 000003 | ............ |
|---|---|---|---|---|---|
| No. of Sector | 000000 | 000001 | 000003 | 000004 | ............ |

MAX : 819        #Entry : 95.        #SpareUsed : 05

| LBA | SPARE | CAN | RE | WE | PRE | TACAN |
|---|---|---|---|---|---|---|
| 001FB770 | 0000 | 0 | 0 | 1 | 0 | 0 |
| 001FB771 | 0001 | 0 | 1 | 0 | 0 | 0 |
| 001FB772 | 0002 | 0 | 0 | 1 | 0 | 0 |
| 001FB773 | 0003 | 0 | 0 | 0 | 1 | 0 |
| 003DA124 | 0004 | 0 | 0 | 1 | 0 | 1 |

CAN: An alternative sector is assigned when recording data in a data sector that corresponds to an LBA having been recorded as an error during reproducing.

RE: An alternative sector is assigned due to an error during reproducing.

WE: An alternative sector is assigned due to an error during recording.

PRE: Although an error is recovered during reproducing, an alternative sector is assigned since there is a possibility of an error arising during next reproduction.

TACAN: An alternative sector is temporarily assigned.

FIG. 3

METHOD AND APPARATUS FOR ERROR RECOVERY IN A STORAGE DEVICE

BACKGROUND OF THE INVENTION

1. Field of the Invention

The present invention relates to a storage device such as a disk drive, an error recovery processing method for execution therein.

2. Description of Related Art

A disk drive device using a magnetic disk as a recording medium uses a head for recording and reproducing data on the magnetic disk. This head is installed under the bottom surface (nearest the surface of the magnetic disk) of a head/slider having an air bearing surface. The terms "head" and "slider" are used somewhat interchangeably in the art unless it is clear from the context that another meaning is implied. The slider is installed at an end of an arm, which moves the slider in an arcuate, nearly radial direction over the magnetic disk by a rotary actuator or voice coil motor (VCM).

In addition, the slider is urged toward the magnetic disk by an elastic suspension member installed in the arm. When air flows into between the head slider and magnetic disk with the rotation of the magnetic disk, the slider floats or flies up from the magnetic disk surface against resistance of the elastic member. A gap between the magnetic disk and slider is a predetermined value determined in part by the relative speed between the air bearing surface of the slider and magnetic disk.

The gap between the slider and magnetic disk may become too small if the slider is deformed by thermal expansion or the like and a specific portion protrudes toward the magnetic disk. In addition, the surface of the magnetic disk inevitably has a certain degree of asperity. The slider may even collide with an asperity on the surface of the magnetic disk. If a collision occurs, local temperatures in the slider may sharply increase due to frictional heat and the like. The term "thermal asperity" is used for this condition.

In particular, a magnetic transducer (or head) using an MR (magnetoresistance effect) element or a GMR (giant magnetoresistance effect) element suffers decreased reliability since an increase of the temperature leads to a large change of the output signal. In some cases, the head will not function at all.

For this reason, conventionally, there are disk drive devices with countermeasures such as correction of a head output caused by the temperature change with using a DC component of the reproduced output of the head. Nevertheless, there are many cases where it is not sufficient to only correct the head output at the time of the thermal asperity.

In addition, there can be areas where the thermal asperity occurs permanently. Therefore, for example, as disclosed in Published Unexamined Patent Application No. 9-251727, there are disk drive devices where each area where the thermal asperity occurs permanently is marked as a defective sector.

Since positional information is conventionally is detected on the basis of signals output by the head which are generated by from servo sector information recorded on the disk, thermal asperities may result in the servo sector information being missed.

For this reason, a method is devised to estimate a slider's position with using appropriate positional information such as a reproduced output from a previous servo sector even if a servo sector just before a data sector is not correctly reproduced.

It may be possible to read and write in an area, which has been designated as an area where the thermal asperity has occurred permanently, so long as head temperature falls thereafter. In these cases the number of defective sectors increases unnecessarily.

SUMMARY OF THE INVENTION

The present invention is made in consideration of the above problems and provides a disk drive device and an error recovery processing method for execution therein which contribute to maintenance of recording capacity and to enhancement of reliability by recovering from errors caused by temporary conditions which prior art drives treat as permanent errors.

A disk drive device according to the present invention comprises means for detecting an error occurring during reading or writing, means for executing a first error recovery procedure on the failing location, means for executing a second error recovery procedure on the failing location only after predetermined waiting time elapses.

In addition, a disk drive embodiment according to the invention can include a temperature sensor for detecting a temperature at the disk drive (either inside or outside the disk drive, and an error processing means which sets the waiting time between the first and second error recovery procedures according to the temperature detected to allow time for the temperature to decline and thereby increasing the likelihood of recovery.

Furthermore, another disk drive embodiment according to the invention includes alternative area (typically a sector) assigning means for taking a failing area out of service by performing temporarily assigning (registering) an alternative area to serve in the place of the failing area. The temporary registration is subsequently retested or confirmed after a time period has elapsed by executing a second error recovery procedure. The temporary registration is cancelled if the previously failing area now passes, i.e., the area is recovered. The temporary registration may be made permanent, i.e., changed to a regular registration if the area is not recovered.

BRIEF DESCRIPTION OF THE DRAWINGS

FIG. 3 is a drawing showing an example of a reassignment table;

DETAILED DESCRIPTION OF THE PREFERRED EMBODIMENT

Figure 1:
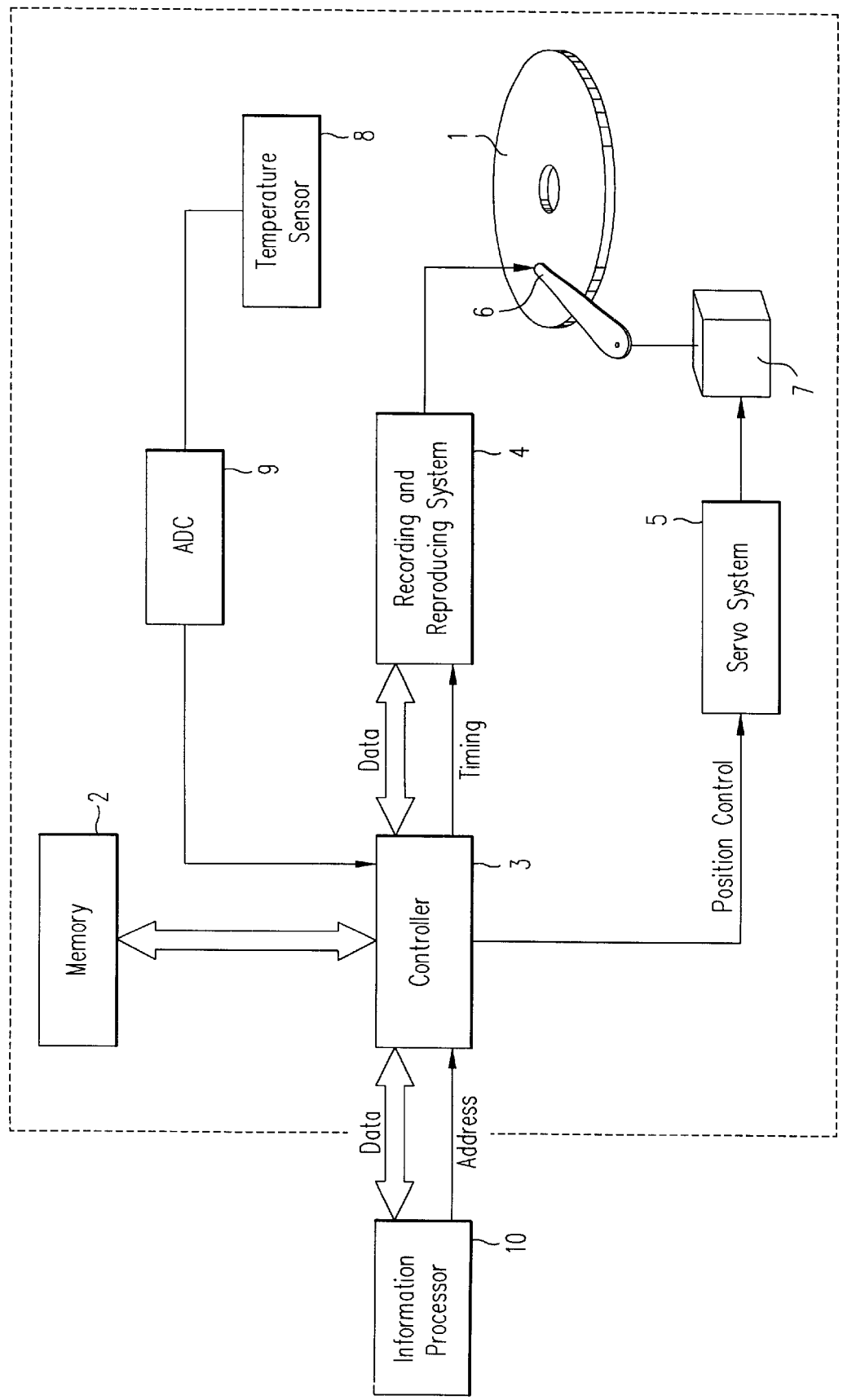
FIG. 1 is a block diagram showing the construction of a disk drive device that is an embodiment of the present invention.

FIG. 1 is a block diagram showing the construction of a disk drive device that is an embodiment of the present invention.

This disk drive device comprises: a magnetic disk 1 for recording data; memory 2 for storing a control program, and recorded data; a controller 3 controlling the operation of the entire disk drive device including input and output of data with a host system 10 such as an external personal computer; a recording and reproducing or channel system 4, which is sometimes called the read/write channel, which performs reading and writing on the magnetic disk 1 on the basis of the control by the controller 3; a servo system 5 controlling positions of the head 6 for reading and writing on the disk 1; a head drive mechanism 7 moving the head 6 on the basis of the control by the servo system 5; a temperature sensor 8 detecting temperature of the outside or inside of the disk drive device; and an AD converter (ADC) 9 performing AD conversion of the output of the temperature sensor 8.

The memory 2 is where data to be recorded and reproduced data is cached or buffered temporarily. The memory 2 is also where a control program for the controller 3, internal data (for example, a reassignment table and the like), etc. are stored. The buffer area in memory 2 typically has capacity for several hundred data sectors. The controller 3 comprises a processor that executes the control program, a hard disk controller, and the like. This controller 3 controls the operation of the entire disk drive device by executing the control program stored in the memory 2. Furthermore, the controller 3 controls recording and reproduction of data on the magnetic disk 1 in response to commands and data supplied from the host system 10.

The controller 3 can execute a plurality of processes in parallel, and hence controls communication with the host system 10, cache management, the position of the head 6, and the like.

The head 6 comprises, for example, an inductance type writing head, and a reproducing or read head using, for example, an MR (magnetoresistance effect) element or a GMR (giant magnetoresistance effect) element.

Figures 2, 5:
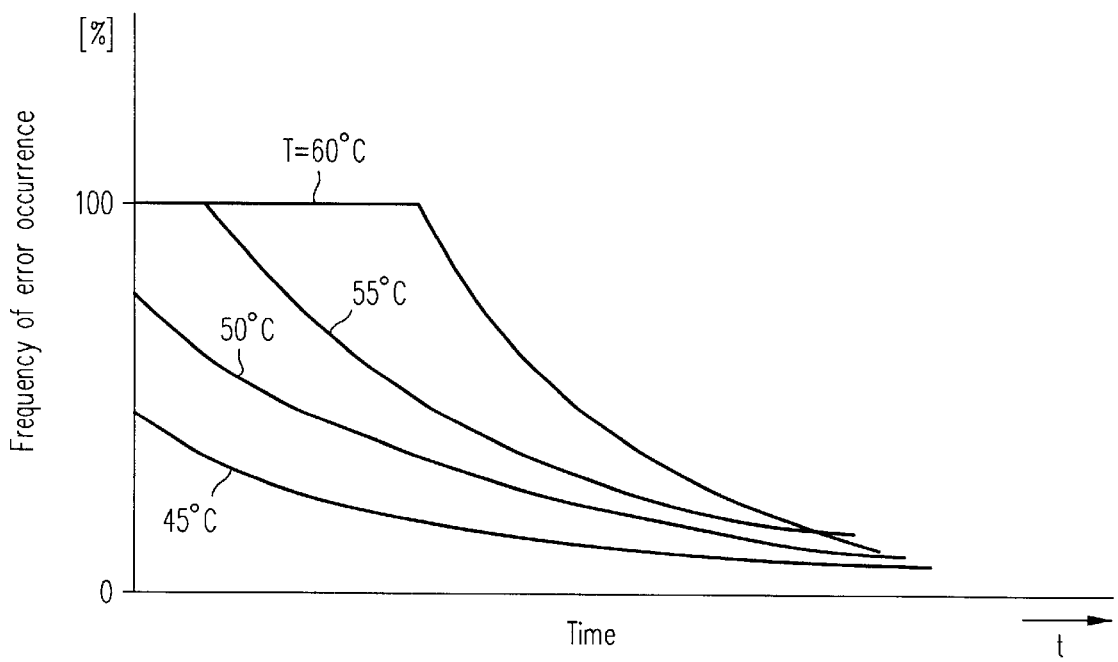
FIG. 2 is a drawing showing an example of a conversion table showing correspondence between the logical block address (LBA), which is supplied by a host system in instructions, and the data sector.
FIG. 5 is a graph showing the change of the frequency of error occurrence corresponding to temperature in a disk drive device and waiting time.

On a recording surface of the magnetic disk 1, a large number of recording tracks are formed, for example, in the radial direction. On each of these tracks, data sectors whose number depends on a position in the radial direction and the like are recorded, and reading and writing is performed with data sectors as the unit. On the other hand, commands from the host system 10 for reading and writing use a predetermined logical block addresses (LBA). Therefore, the controller 3 performs conversion between the LBA from the host system 10, and the physical data sector by using, for example, as shown in FIG. 2, a conversion table showing the correspondence (i.e., mapping) of each LBA to a data sector.

Hereinafter, the operation of the disk drive device constructed like this will be described.

In recording tracks on the magnetic disk 1, a servo sector is recorded per predetermined angle (for example, 360°/66) for identifying each track, detecting a tracking error, or the like. The position of the head 6 is determined by the controller 3 from the output the head 6 generated when the servo sector bursts pass under the head. In addition, the controller 3 obtains a recording track, where a corresponding data sector is recorded, from an LBA instructed by the host system 10, and obtains a positional error (PES) with comparing to the position of the head 6 supplied by the channel system 4. Then, the controller 3 moves the head 6 to a target recording track (target track) with controlling the servo system 5 according to this PES.

When the head 6 is moved to the target track, the controller 3 instructs reading or writing operations at the proper time when the data sector corresponding to the LBA icomes around to the head. During use of the disk drive device, failing areas (bad sectors) may be encountered where normal reading and writing cannot be performed. To compensate for this, spare areas are provided on the recording surface beforehand, and, if a bad sector is found, a data sector in the spare area is assigned to take the place of the bad sector. By doing this, reading and writing can be performed as if an error did not occur, when viewed from the host system 10.

Assignment of a spare sector is managed with, for example, a reassignment table shown in FIG. 3. This reassignment table, as shown in FIG. 3, includes LBAs corresponding to data sectors for which spare sectors are assigned, spare sector numbers (SPARE) corresponding to these LBAs, and flags (CAN, RE, WE, PRE, and TACAN) show states of the assignments.

When reading or writing is instructed with an LBA being supplied by the host system 10, the controller 3 refers to this reassignment table and checks whether a spare sector is assigned to the data sector corresponding to the LBA in the instruction. If a spare sector is not assigned, the controller 3 refers to the conversion table shown in FIG. 2, obtains the sector number of the data sector corresponding to the LBA instructed. The controller 3 directs the channel system 4 to execute the reading or writing operation on the data sector corresponding to the sector number obtained. On the other hand, if a spare sector is assigned to the data sector corresponding to the LBA instructed, the controller 3 directs the channel system 4 to execute the operation on the assigned spare sector.

In addition, the channel system 4 detects whether the operation on the magnetic disk 1 has terminated normally, and supplies the detection result to the controller 3.

Figure 4:
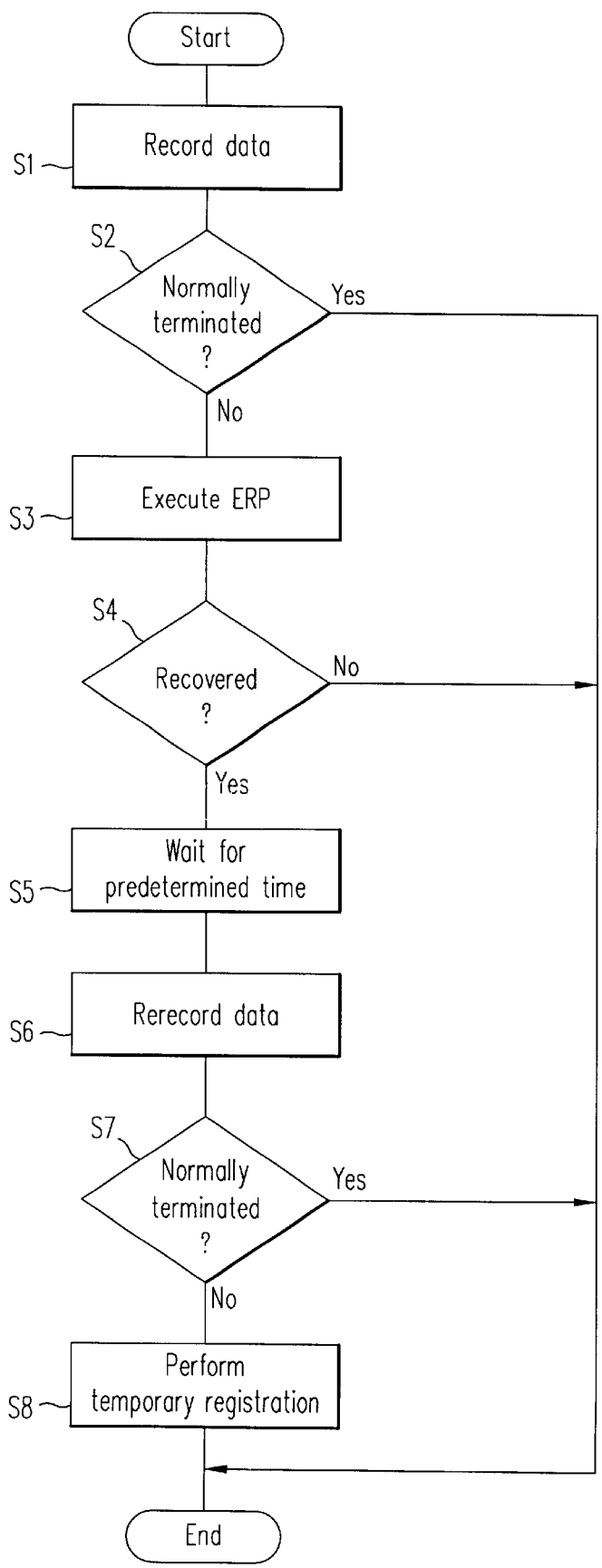
FIG. 4 is a flow chart showing error recovery procedure according to the invention.

FIG. 4 is a flow chart showing the write operation. When writing is instructed by the host system 10 with the data to be recorded and an LBA being supplied, the operation is started from step S1 in FIG. 4.

First, at step S1, the controller 3 directs data recording with supplying the data to be recorded to the channel system 4 at the predetermined timing, and the process goes to the subsequent step S2. The controller 3 supplies the information showing whether this recording operation has terminated successfully S7.

At the step S2, the controller 3 judges whether the writing operation has terminated normally, and, if so, the operation is complete. If an error occurs, the process goes to step S3 to execute an error recovery procedure (ERP).

In this ERP, the controller 3 repeats the attempt to write several times while changing, for example, an offset from the reference position of the head 6 by controlling the servo system 5, or recording parameters such as for the filtering performed by the channel system 4 described above.

After completion of the ERP, the process goes to step S4, the recording operation is complete only if the recording has terminated normally after the ERP. If the ERP fails a predetermined number of times, the waiting period for a predetermined time is invoked at step S5. The process goes to step S6 after waiting to perform a second recording operation. After that the process goes to step S7.

In this manner, if the cause of the error is sharp increase of the temperature of the head 6 due to collision of a protrusion caused by the thermal expansion of the head 6 with an asperity on the surface of the magnetic disk 1, it becomes possible to perform normal recording by performing the recording operation again after waiting. It is because the temperature of the head 6 falls during the waiting time and the gap between the protrusion of the head 6 and the surface of the magnetic disk 1 becomes large enough to function again.

FIG. 5 is a graph showing the change of the frequency of error occurrence depending on temperature in a disk drive device and waiting time. It can be seen from FIG. 5 that, if the temperature inside the disk drive device is high, lowering of the frequency of error occurrence is slow, and, if the temperature inside the disk drive device is low, lowering of the frequency of error occurrence is fast.

Therefore, by setting the waiting time long if the temperature is high, and short if it is low on the basis of the temperature data from inside the disk drive device supplied by the temperature sensor 8 through the ADC 9, it becomes possible to optimize the balance between the lowering of performance due to the waiting time and the enhancement of recording reliability.

Furthermore, at step S7, the controller 3 judges whether the re-recording has normally terminated, and, if normally terminated, the recording operation is complete. On the contrary, if an error occurs and the recording operation has not normally terminated, the process goes to step S8. At the step S8, the controller 3 designates the failing data sector or location as defective, temporarily assigns a spare sector to become a substitute, and records data in this spare sector in place of the failing sector. In this way the failing sector is removed from service. Furthermore, the controller 3 records the LBA corresponding to the data sector, to which the spare sector is assigned, and the identifier of the spare sector, being assigned, in the above-described reassignment table and appropriately sets the flag showing that the error has occurred. In this case, the controller 3 sets the flag WE to "1" showing that the error was during recording and the flag TACAN showing that the assignment is temporary. In addition, if an error occurs during reading and temporary registration is performed, the controller 3 sets to "1" the flag RE showing that the error is a read error and again the flag TACAN showing the assignment is temporary.

This reassignment table is recorded in, for example, a predetermined area on the magnetic disk 1, or non-volatile memory provided in the controller 3. The table is copied into the memory of the controller 3 in order to accelerate operations when the drive is first turned on or resets.

In this manner, by assigning a spare sector to a sector designated as a defective sector, hereinafter, reading and writing is performed on the assigned spare sector, when the defective sector would normally be used.

In addition, if a read error occurs, the operation similar to the operation in FIG. 4 is executed. The difference is that reading is performed instead of writing at the steps S2 and S6, and ERP, and that the controller 3 sets the flag RE to "1" instead of the flag WE when temporary registration is performed at the step S8.

As described above, in this disk drive device, it is possible to perform reading and writing by avoiding an error caused by a temperature increase of the head 6 by letting a predetermined waiting time elapse in the case where the error had been not resolved by executing the first error recovery procedure.

Therefore, it is possible to prevent the decrease of recording capacity by preventing unnecessary assignment of spare sectors. In addition, since it is possible to perform reading and writing, which is similar to normal recording and reproducing, by avoiding an error due to the temperature increase of the head 6, it is possible to increase reliability.

It may become possible to perform normal reading and writing on the data sector, to which a spare sector has temporarily been assigned as described above, when the temperature of the head 6 falls after some time has elapsed. If this state is left as it is, spare sectors are unnecessarily consumed, and hence, this leads to shortage of spare sectors, lowering of access speed, and the like.

Generally, the shortage of spare sectors arises due to limitation of the number of spare sectors. The lowering of access speed arises typically because the spare sectors are provided in the most inner track and the head 6 has to be moved to the track where spare sectors are provided, every time access to a data sector to which a spare sector is assigned is instructed.

The disk drive according to the invention, therefore, retests or confirms the temporary registration to the data sector after a predetermined time from the time of the temporary registration has elapsed. If normal recording can be performed, the temporary registration is reversed or deleted, and, if not, the disk drive changes the temporary registration to a permanent regular registration.

Figure 6:
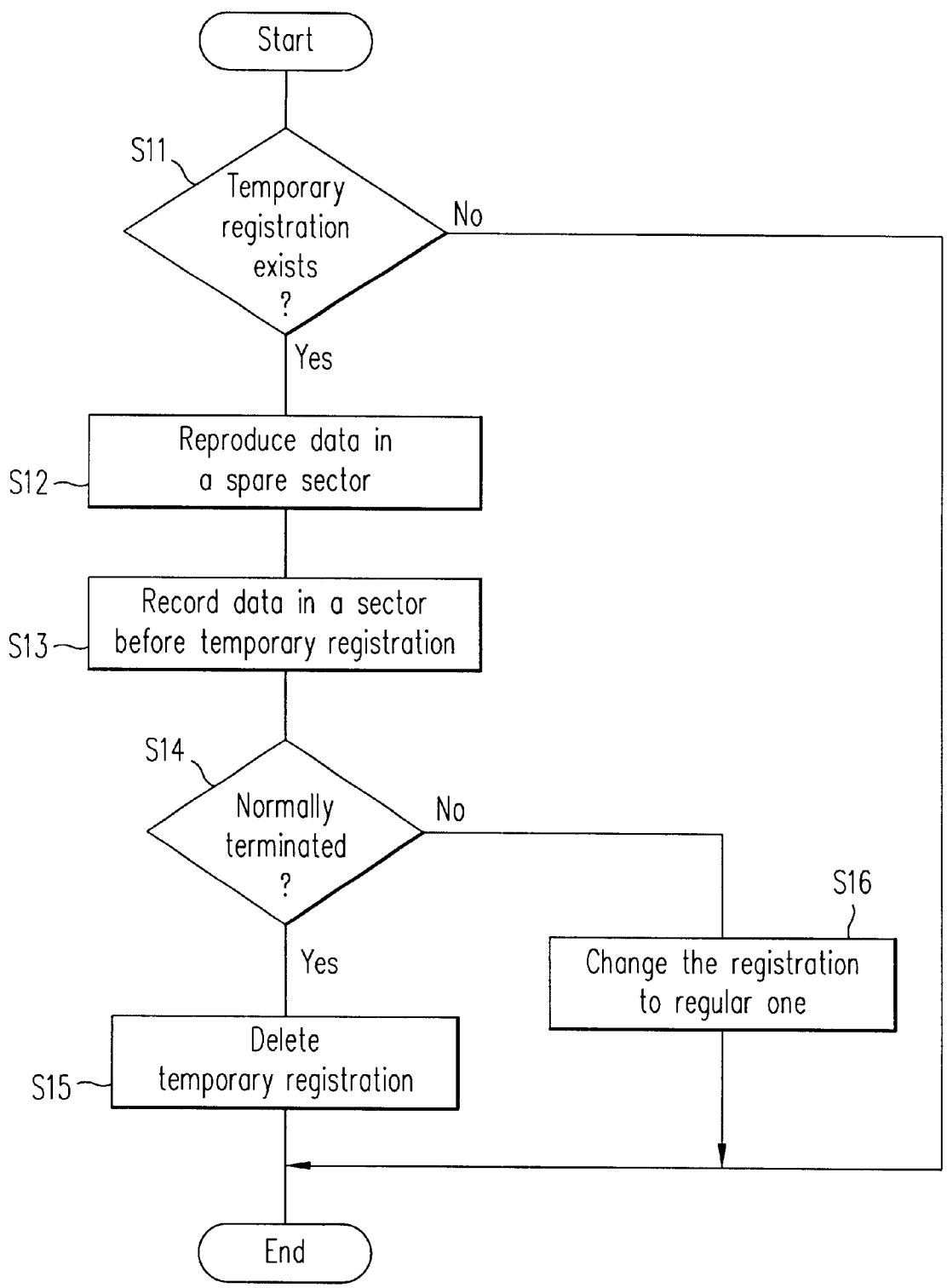
FIG. 6 is a flow chart showing the confirming retest of temporary registration.

FIG. 6 is a flow chart showing the confirming operation for this temporary registration. The confirming operation is activated after predetermined time elapsed from the temporary registration by the controller 3 counting the time after the temporary registration in FIG. 2 was performed. Execution starts from step S11 in FIG. 6. Alternatively, the operation can include confirming at the time of startup whether I/O operation with the host system 10, or other operation, which has large load or is important, such as the ERP described above is being executed, and being started after completion of this operation if this operation is being executed. In addition, the controller 3 can start the confirmative operation of the temporary registration at regular periods.

First, at the step S11, the controller 3 confirms the reassignment table shown in FIG. 3 described above. Furthermore, the controller 3 confirms whether the data sector, which was temporarily registered at the step S8 in FIG. 4 described above, exists, that is, whether a data sector, whose TACAN flag in the reassignment table is "1", exists. If the temporary registration does not exist, the confirmative operation is completed, and, if exists, the process goes to the subsequent step S12.

Next, at the step S12, the controller 3 instructs the channel system 4 to retreive the data in the assigned spare sector and to record this data in the original data sector at the step S13. At the step S14, the controller 3 judges whether the recording operation is normally terminated, and, if normally terminated, the process goes to step S15 to complete the confirmative operation of the temporary registration after cancellation of the temporary registration. Concretely, the controller 3 deletes the data relating to the data sector in the reassignment table described above. By doing this the temporary registration is cancelled, the data sector is treated as a defect-free data sector, and the spare sector assigned to this data sector also is released.

On the contrary, if the recording is not normally terminated at the step S14, the process goes to step S16, and the controller 3 changes the temporary registration to regular registration to complete the confirmation. Concretely, the controller 3 resets the flag TACAN in the reassignment table, described above, to 0. As described above, since the controller 3 not only sets the flag WE or RE to "1" but also sets the flag TACAN to "1" at the time of the temporary registration, then only the flag WE or RE stays "1" and the flag TACAN is reset to "0". Hence, hereinafter, the registration regarding the data sector is treated as a regular registration.

In addition, the controller can judge whether other temporary registrations exists before completion of confirmative operations and reexecute the operation from the step S11 if so, and terminate the operation if not.

By confirming temporary registration in regard to sectors temporarily registered like this, it is possible to use sectors, where normal recording and reproducing can be performed if the temperature of the head 6 falls, among sectors, which have been temporarily registered as defective sectors, as defect-free sectors. Thus, it is possible to prevent the storage capacity of a disk drive device from unnecessarily decreasing. In addition, since it is possible to release spare sectors assigned by the temporary registration, it is possible to resolve shortage of spare sectors, prevent lowering of access speed, and the like.

In addition, the present invention is not limited to the embodiments described above. For example, although cases that the present invention is applied to disk drive devices are described in the embodiments, application objects of the present invention are not limited to disk drive devices, but can be other disk recording media such as an magneto-optical disk. Therefore, it is possible to perform necessary modification within the scope of technical idea of the present invention.

According to the present invention, it is possible to avoid an error caused by a temperature increase by retesting after a predetermined time elapsed, Therefore, it is possible to contribute to maintenance of recording capacity and enhancement of reliability.

In addition, by confirming temporary registrations of alternate sectors, cancelling the temporary registration if an error is recoverable, and changing the temporary registration to regular registration if not recoverable, it is possible to use areas, which would otherwise have been marked as defective because of temporarily increased temperature Therefore, it is possible to prevent the recording capacity of a disk drive device from unnecessarily decreasing.

We claim:

1. An error recovery method for a storage device, comprising:

detecting an error occurring during reading or writing information on a recording medium at a first location;

executing a first error recovery procedure on the first location; and if the first error recovery procedure fails, measuring a temperature at the disk drive, determining a selected time using the temperature and performing a second error recovery procedure on the first location area after delaying the selected time.

2. The method of claim 1 wherein the determining a selected time responds to a higher temperature by selecting a time period which is longer than a time period selected for a lower temperature.

3. A storage device comprising:

a temperature sensor which measures a temperature at the disk drive;

a controller which executes a first error recovery procedure after detecting an error occurring during reading or writing operations on a recording medium at a first location, and which responds to failure of the first error recovery procedure by determining a selected time period using the temperature and performs a second error recovery procedure on the first location area after waiting the selected time period.

4. The storage device of claim 3 wherein the controller responds to a higher temperature by selecting a time period which is longer than a time period selected for a lower temperature.

5. A storage device comprising:

a recording medium;

a channel system for reading and writing information on the recording medium and detecting an error occurring during reading or writing to a first location;

a temperature sensor for measuring a temperature at the storage device;

a controller which executes a first error recovery procedure when the error at the first location is detected, assigns a second location on the recording medium to serve in place of the first location and remove the first location from service, sets a flag indicating that first location has been temporarily marked as defective, and selects a time period based on the temperature and only after the time period has elapsed, performs a second error recovery procedure on the first location and returns the first location to service if the second error recovery procedure is successful.

6. The storage device according to claim 5, further comprising:

a temperature sensor for measuring a temperature, and wherein the controller selects the selected time period according to the temperature.

7. The storage device according to claim 6, wherein the controller increases the selected time when the temperature exceeds a predetermined temperature.

8. The storage device according to claim 5, wherein the controller records information in a reassignment table showing a correspondence between the first location and the second location and that the first area has been temporarily marked as defective.

9. The storage device according to claim 5, wherein the controller resets the flag indicating that first location has been temporarily marked as defective and thereby permanently marks the first location as defective after a selected number of attempts at error recovery have failed.

\* \* \* \* \*